United States Patent [19]
Biagiotti

[11] Patent Number: 5,475,917
[45] Date of Patent: Dec. 19, 1995

[54] TRIM REMOVING APPARATUS ASSOCIATED WITH A CUTTING-OFF MACHINE FOR THE FORMATION OF SMALL ROLLS OF TOILET PAPER OR THE LIKE

[75] Inventor: Guglielmo Biagiotti, Lucca, Italy

[73] Assignee: Fabio Perini S.p.A., Lucca, Italy

[21] Appl. No.: 126,185

[22] Filed: Sep. 24, 1993

[30] Foreign Application Priority Data

Sep. 28, 1992 [IT] Italy .................................. FI92A0188

[51] Int. Cl.$^6$ .............................. B26D 7/18; B65B 43/52
[52] U.S. Cl. ..................... 29/822; 29/DIG. 78; 198/428; 209/643
[58] Field of Search ............................. 29/822, 823, 819, 29/809, DIG. 78; 198/428, 471.1; 209/643; 414/920–923

[56] References Cited

U.S. PATENT DOCUMENTS 4,718,535  1/1988  Wolff ........................................ 198/428
5,152,390  10/1992  Kubota et al. .................... 198/471.1 X

FOREIGN PATENT DOCUMENTS 2137918  10/1984  United Kingdom.

Primary Examiner—Timothy V. Eley
Assistant Examiner—Khan V. Nguyen
Attorney, Agent, or Firm—Francis J. Bouda

[57] ABSTRACT

An apparatus is provided for the removal of "trims" and other waste from small rolls of toilet paper, all-purpose wipers and other articles, with arrangement for thrust-operated advancement of rows of said small rolls (R). It includes at least a continuous belt element 12, with a suction box 30 able to hold the small rolls (R) in suspension and to move the latter forward, while excluding the "trims" (RF) or other scraps from this action. The continuous belt element 12 has uniformly distributed apertures (22) and, in its lower active travel portion, moves at a speed at least equal to the average feeding speed of the small rolls. It slides beneath the suction box 30 which exerts a pneumatic aspirating and retaining action on the row of advancing small rolls. In one embodiment, the continuous belt 12 has portions without apertures which, during its motion which is synchronized with that of the small rolls being pushed forward, corresponds to the space between the end of a row of small rolls formed from a log and the beginning of the row formed from the subsequent log.

15 Claims, 6 Drawing Sheets

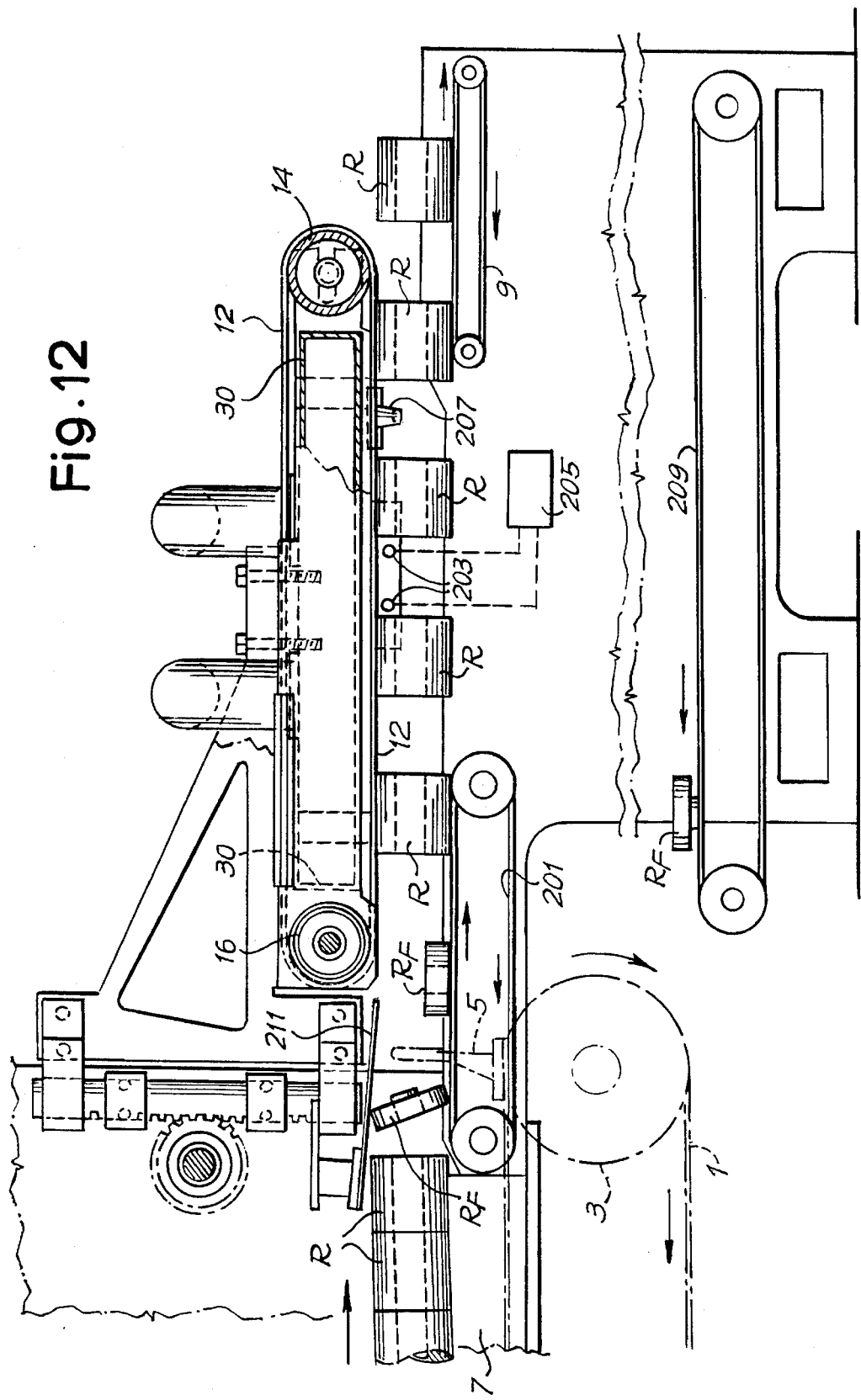

TRIM REMOVING APPARATUS ASSOCIATED WITH A CUTTING-OFF MACHINE FOR THE FORMATION OF SMALL ROLLS OF TOILET PAPER OR THE LIKE

DESCRIPTION

The invention refers to an apparatus for the removal of trims and other scraps from small rolls of web material such as toilet paper, all-purpose wipers and other articles produced by cutting rolls or logs with spaced-apart cuts, said apparatus comprising roll feeding means for advancing rows of small rolls and trim discharging means for eliminating trims or scraps.

An earlier trim-removing apparatus is shown in the German patent DE-B-3 409 504. This apparatus is provided, for a double row of small rolls, with two lower, spaced apart, smooth guide belts and an upper chain, the latter being located between the belts and carrying a set of log-supporting elements. The rolls are fed to this system by three flexible members, each roll resting on one of the lower belts and on one of the upper support elements. The chain-borne support elements are disposed at regular intervals corresponding to the length of the small rolls being produced, thereby causing each small roll to correspond to a support element. At pre-determined positions along the chain, one of the support elements is missing, so as not to provide the small roll with upper support in correspondence of this interruption. By positioning this interruption in correspondence of the position taken up by the leading and trailing trims, respectively, of two subsequent logs, these trims fall down due to lack of upper support.

This apparatus is very reliable and efficient, but has the drawback of a considerable length and a certain complexity, as far as the adaptation of the apparatus to different lengths and diameters of the logs are concerned.

The object of the present invention is a new type of apparatus for the removal of trims and other scraps from small rolls cut out from logs of web material.

According to the present invention, an apparatus is provided which includes at least a continuous flexible member with apertures arranged along its longitudinal development, and pneumatic suction means cooperating with said continuous flexible member. Said flexible member receives the rolls from a roll feeding means, suspends said rolls therefrom by means of the vacuum operated by said pneumatic suction means through said apertures, and moves said rolls away from said roll-feeding means. The flexible member contacts the rolls in correspondence of the upper portion of their cylindrical surface.

In a particularly advantageous embodiment, said pneumatic suction means includes a suction box with a bottom and at least one row of ports or a longitudinally extending slot in said bottom. Said flexible member slides along and in contact with the outer surface of said bottom, along said row of ports or said slot.

According to a preferred embodiment of the apparatus of the present invention, a longitudinally extending portion of said flexible belt has no apertures; and the advancing movement of said flexible belt is synchronized with the motion of said roll-feeding means, in order that during said motion said portion of the flexible belt corresponds with the interval between the end of a row of rolls formed from one log and the beginning of the subsequent row of rolls formed from the subsequent log.

This embodiment is of particularly simple construction and can be easily suited to any length of log by simply increasing or decreasing the region without apertures of the continuous flexible belt. The length of the suction portion, i.e., of the region provided with apertures, corresponds substantially to the length of the log, excluding the length of the trims, while the length devoid of apertures allows the discharge of the leading and trailing trims of each log.

The adaptation of the apparatus to different lengths of logs may take place by applying adhesive tape of suitable length, or similar means, across selected apertures of the continuous flexible belt.

The feeding speed of the flexible belt may be uniform and equal to the average speed of the small rolls being cut. Conversely, it is also possible to provide for a variation of the feeding speed of the flexible belt and, in particular, an acceleration thereof, when the portion of said belt without apertures travels below the suction box. This facilitates the discharge of the trims and the passage of the log pushing members which push the rolls cut out from the log.

Further advantageous features of the apparatus according to the invention are set forth in the following disclosure. In particular, the continuous flexible belt may be formed either by a single member having longitudinally distributed apertures, or even by a pair of members extending parallel and at some distance from each other so as to define a suction interspace. Longitudinal flexible continuous edges may be provided at the side of either the interspace or the apertures (in the case of a single tape-like member). Said edges are intended to contact the surface of the small rolls and ensure a vacuum-tight seal and thus a correct retention of the individual small rolls.

With the above and other objects in view, more information and a better understanding of the present invention may be achieved by reference to the following detailed description.

DETAILED DESCRIPTION

For the purpose of illustrating the invention, there is shown in the accompanying drawings a form thereof which is at present preferred, although it is to be understood that the several instrumentalities of which the invention consists can be variously arranged and organized and that the invention is not limited to the precise arrangements and organizations of the instrumentalities as herein shown and described.

In the drawings, wherein like reference characters indicate like parts:

FIG. 12 shows a modified embodiment of the invention.

Figure 1:
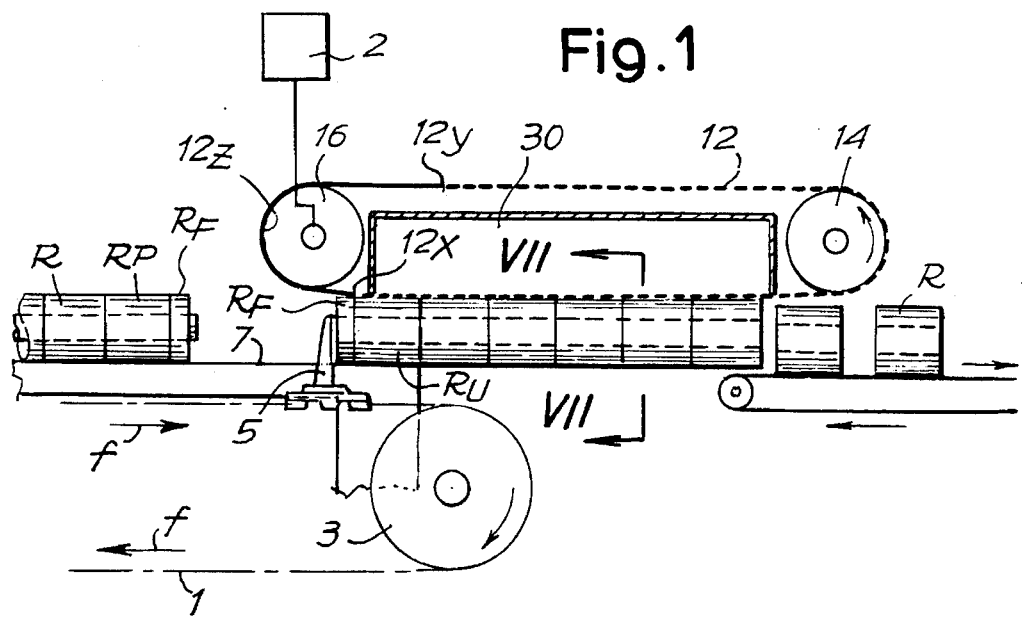
FIGS. 1–6 show schematically six steps of a cycle for the removal of trims at the end of one stick or log and at the beginning of the subsequent stick or log.
Figure 2:
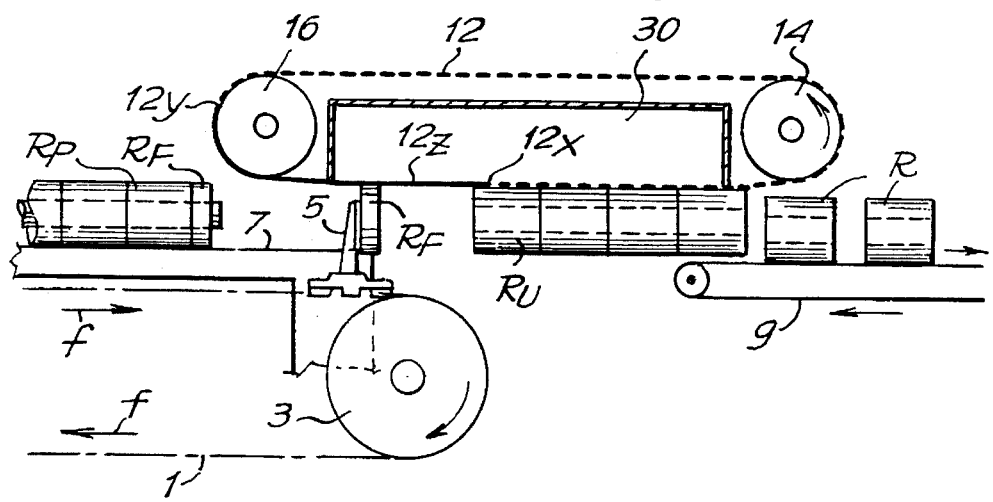

Referring now to the drawings, numeral 1 indicates a continuous belt-like carrier which advances logs to be cut (as well as the rows of small rolls R cut from the logs) being discharged from a rewinder (not shown) of a paper converting line which forms the small rolls of toilet paper, all-purpose wipers and other similar articles. This continuous carrier 1 is driven by wheels (which may be toothed gears if the belt is a chain-belt), one of which is shown at 3. The continuous carrier 1 has a plurality of pushers 5 which are spaced apart by an extent which corresponds substantially at least to the length of the logs, i.e., to the length of a row of small rolls R which are cut out of a log.

As it is known, the cutting of a stick or log for the formation of small rolls R produces also some scrap, so-called trims, indicated by RF, both at the forward end of a row of small rolls R and at the rear end thereof. These trims RF must be separated from the small rolls R so as to prevent such trims from interfering with the subsequent handling and packaging of the small rolls. The present invention allows the removal of the trims RF from a line of rolls R.

In the schematic drawings of FIGS. 1 to 6, numeral 7 indicates a support on which a row of small rolls R, cut out of a log, can slide. The support has a longitudinal recess in which the pushers 5, which move forward in the direction of the arrows shown in the drawing can move. The support 7 terminates just ahead of the wheel 3. After the rolls R leave the support 7, they are supported and moved forward by a different means where the removal of the trims RF takes place between the end of the support 7 and the leading edge of a second conveyor 9. The apparatus of the present invention operates in this area between the conveyors 7 and 9 where it allows the trims RF to be removed by letting them fall into the empty space between the conveyors during which time the rolls R are prevented from falling between the conveyors.

Referring again to FIGS. 1 to 6, numeral 12 indicates a continuous belt with inwardly extending teeth 12A (similar to a timing belt), which travels between two transmission wheels 14, 16, one of which is a driving wheel. The driving wheel may be operated either by a mechanical drive which is kinematically connected to the feeding means made up of wheels 1, 3, or may be operated independently by an electronically controlled motor 2 for the purposes to be indicated hereinafter.

Figure 7:
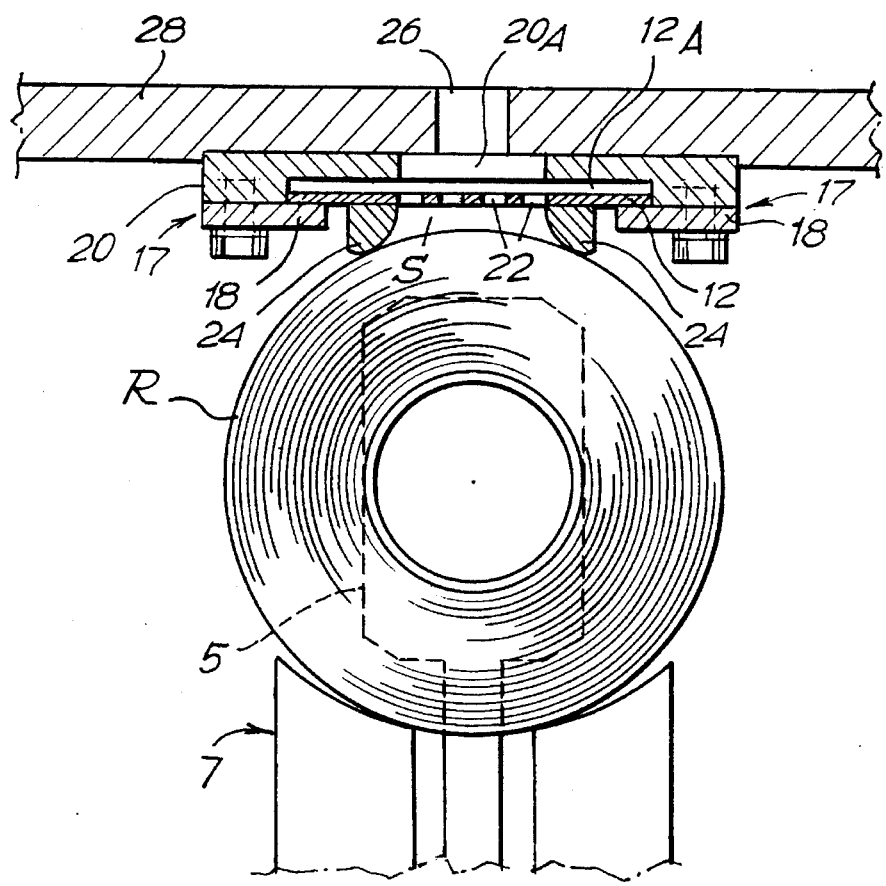
FIG. 7 is a greatly enlarged cross-section taken on line VII—VII of FIG. 1.
Figure 8:
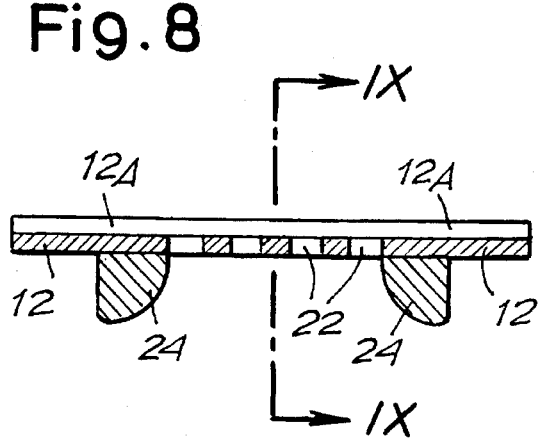
FIG. 8 is a still large cross-section of the belt-member of FIG. 7.
Figure 9:
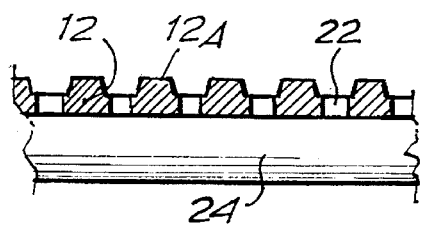
FIG. 9 is a cross-section taken on line IX—IX of FIG. 8 showing the Shape of a portion of the belt-member perforations.

The continuous belt 12 is guided along its lower travel by two side guides 17 which support the longitudinal edges of the belt 12, as shown in detail in FIG. 7. The main elements of these side guides 17 are indicated by 18 and 20 and consist of plates made of a material having low co-efficient of friction, to allow an easy sliding of the toothed belt 12.

Between the guides formed by the plates 18 and 20, and also between the teeth 12A, the toothed belt 12 is provided with perforations 22. These perforations are flanked in the outer sides of the belt 12 by two elastically yielding side lips 24, which extend continuously along the entire length of the belt 12.

The guides 17 may be longitudinally split in two parts or may be longitudinally separated, as shown at 20A, so as to provide passages which are aligned with passages 26 formed in the lower part 28 of a suction box 30 located between the two transmission wheels 14, 16 above the lower portion of the belt 12. As a result of vacuum established inside the box 30, a suction is created through the passages 26 and 20A and through the perforations 22 between the side lips 24 of the lower portion of the toothed belt 12.

A longitudinally-extending section 12Z of the toothed belt 12, between two spaced-apart points 12X and 12Y, is devoid of perforations 22. (See FIGS. 1–6). This portion 12Z extends a distance which is slightly greater than the interspace between the rear part of the last roll RU of a row of small rolls, and the front part of the first roll RP of a following row of rolls cut out of a subsequent log. The trims RF are located within this interspace, between the small rolls RU and RP. These trims, therefore, are between the last roll of the first row of complete rolls and the first roll of the following complete row of rolls, respectively, as shown in FIG. 1.

Because the logs are wound from parent-rolls of different width, during manufacture of the logs, a variation of the abovementioned interspace may take place. Therefore, the length of the region 12Z without holes may be modified by applying suitable closing means in the central perforated region of the belt 12. This modifies the location of the leading and/or trailing points 12X, 12Y of the portion 12Z. The closing may be provided by an adhesive tape or similar means.

During advance of a log on the conveyor 1, and just before reaching the terminal region of the support to 7, the small rolls R come into contact with the underside of the continuous belt 12, just downstream from the transmission wheel 16. Here they come into contact with the resilient lips 24 of said belt 12, thereby forming with the belt and the side lips a space S (FIG. 7) in which a suction is created due to the vacuum in the suction box 30, said suction exerting a retention action on the small rolls R. Accordingly, the small rolls are held by the pneumatic action and advanced by the belt 12 until they reach the conveyor 9, the beginning of the upper section of which is upstream of the downstream end of the suction box 30. In this way, the small rolls held by the belt 12 by the vacuum, are laid down onto the conveyor 9 when the belt reaches the end of the suction box 30. The conveyor 9 moves the small rolls away, and it can also separate them, provided the speed of said conveyor 9 is higher than the speed of belt 12.

The motion of the input conveyor 1 and that of the belt 12 are synchronized in such a way that when the last small roll RU in the row, and its contiguous trim RF, reach the end of the support 7, the end 12X of the non-apertured portion 12Z also reaches said support-end. Thus the last small roll RU (as well as the previous small rolls) are retained under the belt 12 by the suction, while the trim RF meets the non-apertured portion 12Z. Because the trim RF is not held by suction, it falls down, away from belt 12, as shown in FIGS. 3, 4 and 5.

It is to be understood that the belt 12 may be generally without apertures, but made of a material which is pervious to air so that a vacuum in box 30 can create a suction through the belt and act upon the rolls supported against the lips 24 in the selected areas.

Figure 3:
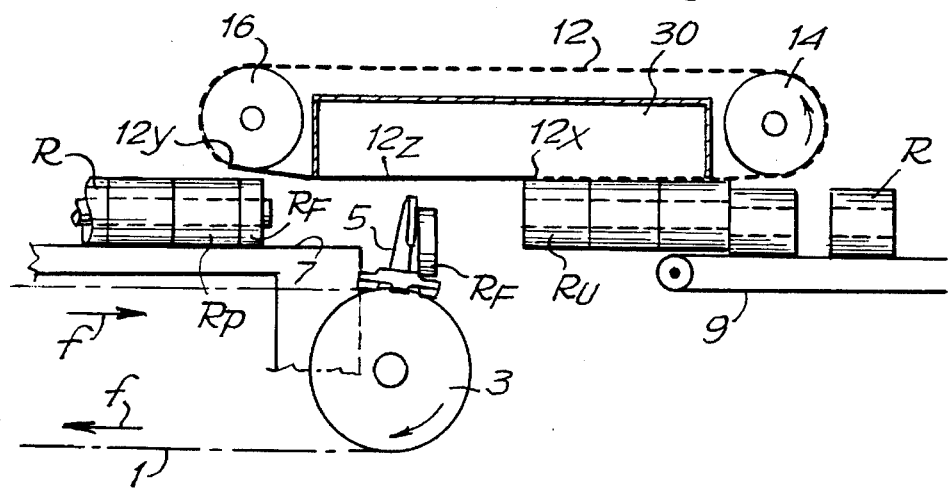
Figure 4:
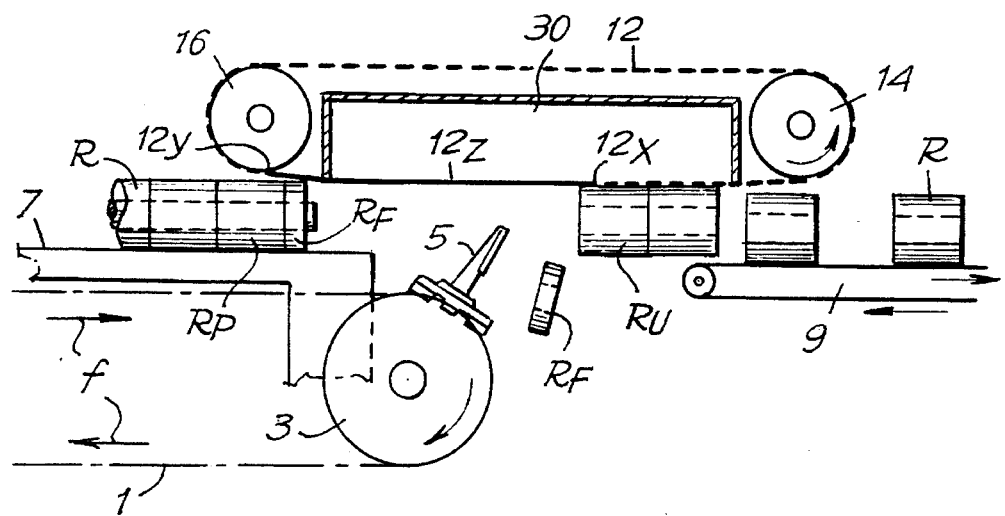
Figure 5:
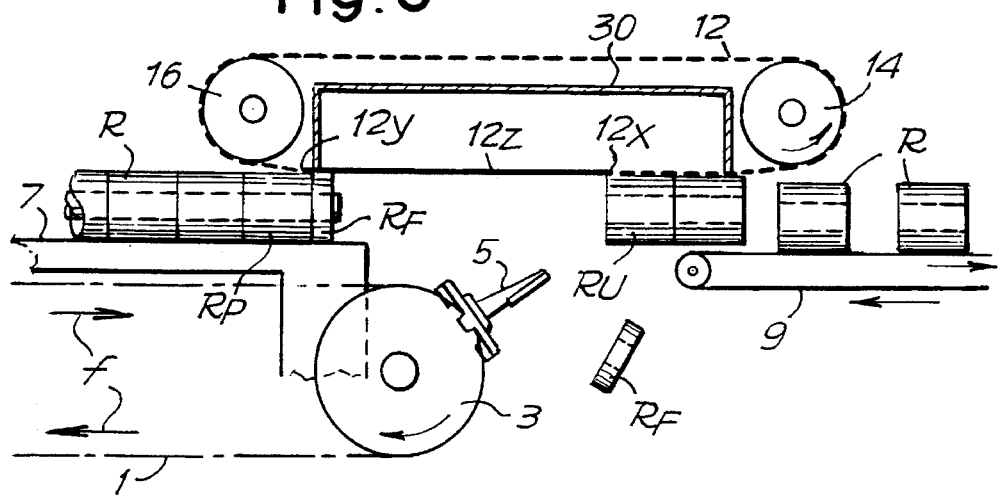
Figure 6:
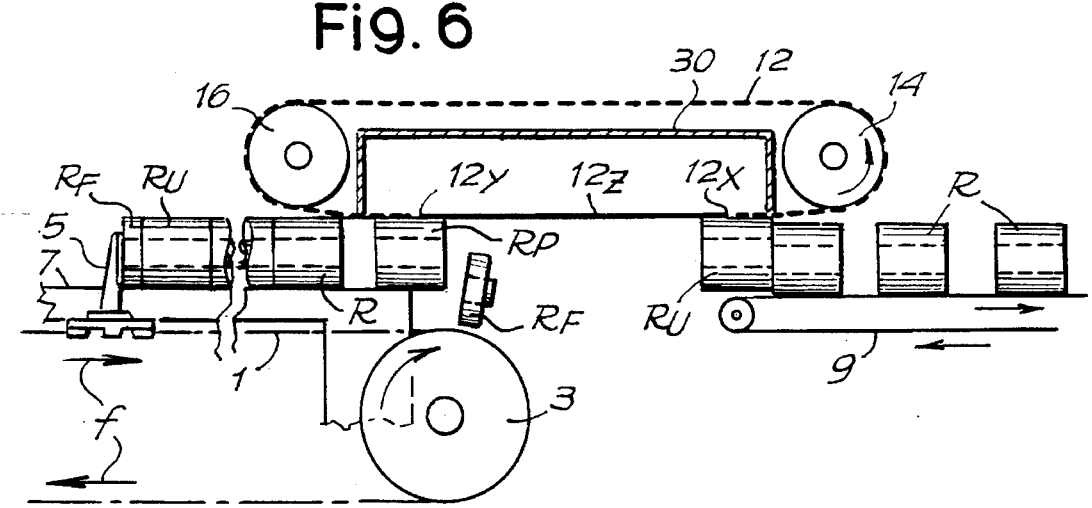

The terminal point 12Y of the non-pervious portion 12Z comes to substantial alignment with the first small roll RP of the next row of advancing small rolls, very close to the adjacent trim RF which precedes the first small roll RP, as shown in FIGS. 3 and 4. As a result, also this initial trim adjacent the small roll RP is not affected by the suction and falls down as shown in FIGS. 5 and 6, while the first small roll RP is retained by the suction beneath the belt 12 as previously explained.

As already pointed out, the conveyor 1 and the belt 12 may be driven at different speeds, i.e., the belt 12 may be driven at an average speed no less than the average speed of the conveyor 1. However, the speed of pushers 5 and the speed of belt 12 may be the same. A cyclic variation of the speed of the belt 12 may be used when the sticks or logs are relatively short with respect to the distance between the pushers 5 so as to avoid a drop in vacuum inside the box 30 caused by an uncovering of the final stretch of the previous portion of belt 12 at the end of its travel beneath the suction box 30. For this purpose, provision may be made for a temporary increase of the speed of transit of the perforated portion of the belt 12 and then a slowing down thereof, during passage below the suction box 30 of the non-perforated portion. A speed difference between belt 12 and pushers 5 (e.g. an acceleration of the belt 12) may be provided during the intermediate step (shown in FIG. 2) between one set of small rolls and the next, to allow the pusher 5 to be rotated about the wheel 3 without interfering with the last small roll being supported by the belt 12. The speed increase of belt 12 tends to project the terminal trim RF out of the pusher and, therefore, to facilitate the discharge thereof.

The varying of the speed of the belt 12 with respect to that of the conveyor 1 may be achieved either with a speed variator (when the actuation of the belt 12 is kinematically connected to the conveyor 1) or with the provision of an independent motor 2 for driving the belt 12, and by regulating said motor according to a suitably timed operated program. In either case, the adjustment of the speed of said belt 12 can be attained with respect to that of the conveyor 1. The independent drive 2 for the belt 12 may be a motor with electronic control or a mechanical drive system with variator.

Figure 10:
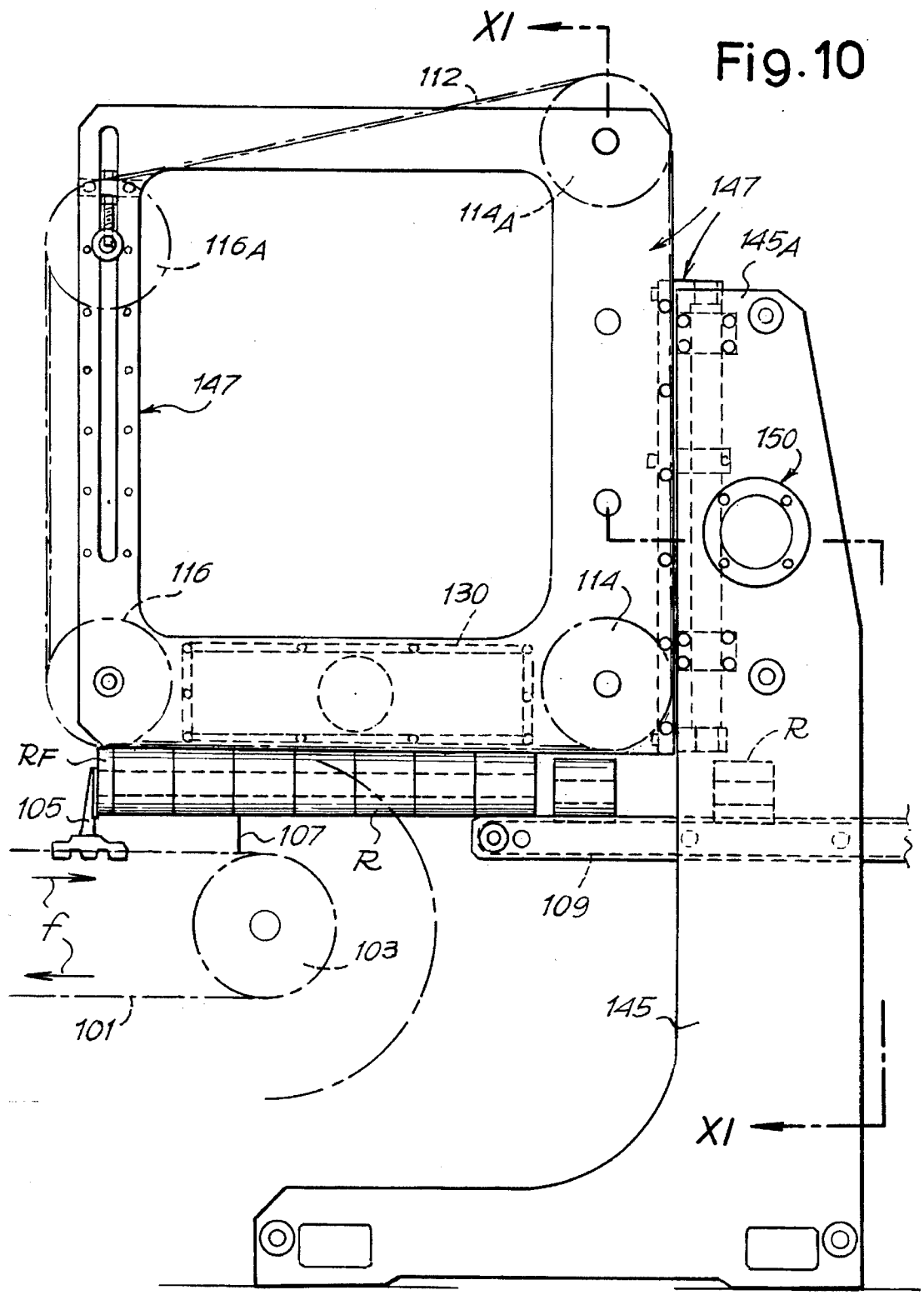
FIG. 10 shows a side view.
Figure 11:
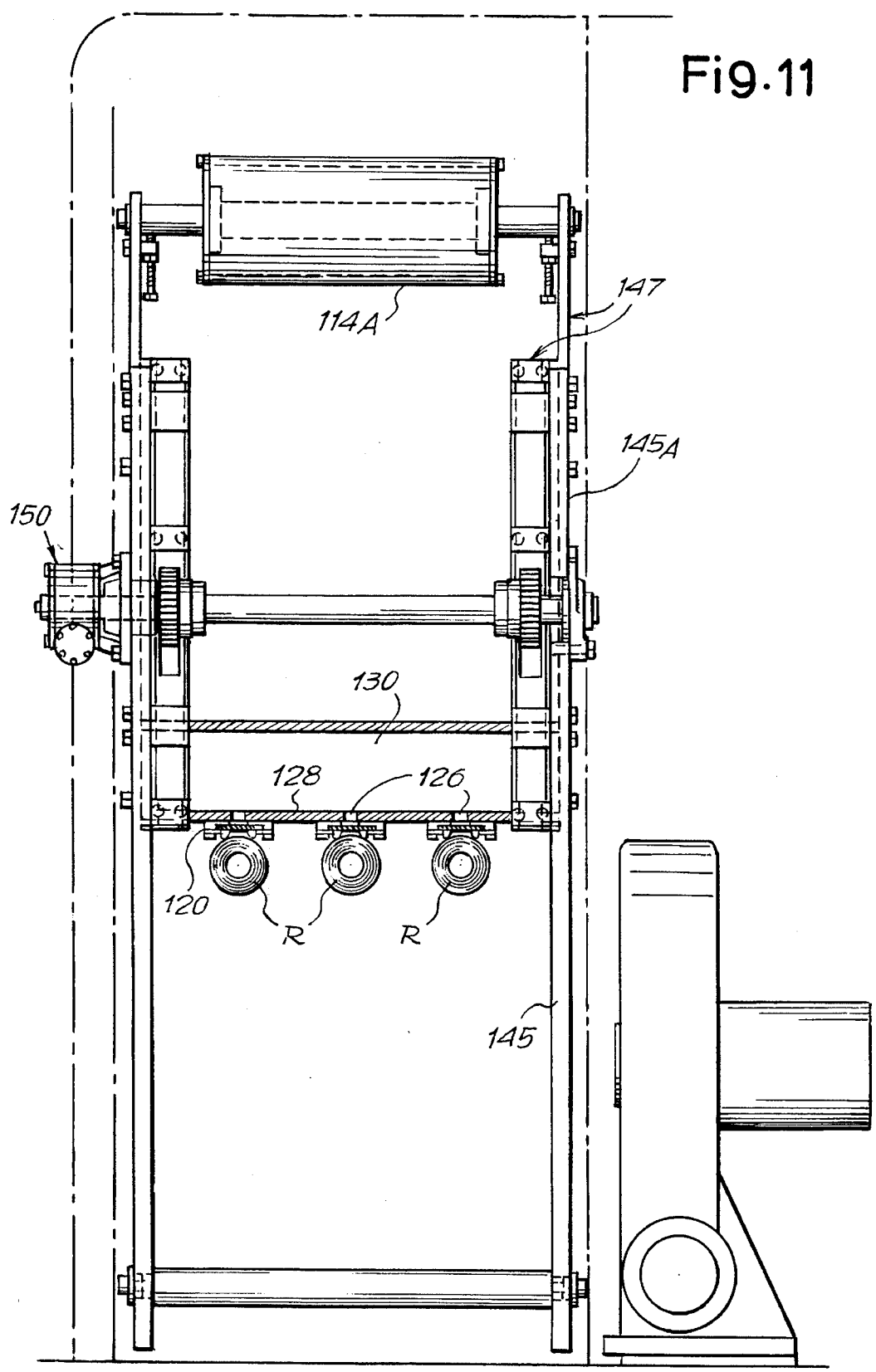
FIG. 11 shows a section on line XI—XI of FIG. 10.

The apparatus must also be able to work effectively on logs of different diameters and, to this end, provision may be made for supporting the group, consisting of the transmission wheels 14, 16, belt 12, and suction box 30, in a vertically adjustable unit. Such a disposition is illustrated in the embodiment of FIGS. 10 and 11, wherein the parts corresponding to those of FIGS. 1 to 6 are designated by the same reference numbers but increased by 100. In FIGS. 10 and 11 (showing a system for the advancement of three rows of small rolls with three tracks and three conveying and belt systems), a main frame 145, which supports the advancing and conveying system 101, 103, 105, includes vertical slide guides for a unit 147 capable of being adjusted in height by means, for example, of a motor-reducer 150. The slide guides being made with ball-bearings or other rolling guide systems.

The unit 147 carries the suction box 130 and the transmission wheels 114 and 116 which define the lower portion of the perforated, toothed belt 112. This belt 112 has a length greater than member 12 of FIGS. 1–6 and is driven by further transmission wheels such as those shown at 114A and 116A. By suitably adjusting the unit 147 in height, there is obtained a placement of the distance between the supports 107 for the small rolls R pushed by the pushers 105 and the lower active suction-portion of belt 112. The latter being provided, also in this case, with the side lips 24 and the non-perforated portion, such as that indicated by 12Z in the first embodiment described herein.

FIG. 12 shows a further modified embodiment of the device of the present invention. Parts corresponding to those of FIGS. 1–6 are referred to by the same reference numbers. In this case, the flexible belt 12 is provided with apertures (such as those designated 22 in FIGS. 1–6) along its entire development, without interruptions. Between the conveyor 1 and the belt 12, a further conveyor 201 is arranged, which moves at a speed faster than the speed of conveyor 1. Consequently, the rolls R are transferred to the belt 12 in a spaced relationship, as clearly shown in FIG. 12. A sensor 203, in the form of a dual pair of electric eyes, is arranged on the frame carrying the vacuum box 30. Sensor 203 detects the length of each roll R passing through the electric eye arrangement and by means of a micro-computer 205 a signal is generated whenever the detected length is lower than a given threshold. This signal timely activates a compressed-air arrangement 207 which by means of a jet of air blows the trim from the belt 12 and onto a conveyor 209.

To make the device more reliable, a flexible sheet 211 can be provided, which causes the trims to tilt and no trim comes into contact with the belt 12.

The embodiment of FIG. 12 has the advantage that no synchronization is required between the conveyor 1 and the belt 12.

It is understood that the drawing shows an exemplification given only as a practical demonstration of the invention, as this may vary in the forms and dispositions without nevertheless coming out from the scope of the idea on which the same invention is based.

Having thus described my invention, what is claimed as new and desired to protect by Letters Patent are the following:

1. An apparatus for removing trims or scraps from small rolls of logs of web material, said apparatus including a roll conveyor (1; 101) for advancing rows of said small rolls (R) in spacial relation to succeeding rows at a predetermined speed, to provide intervals between successive rows, and trim discharging means, and further comprises:

a continuous flexible belt (12; 112) with apertures (22) arranged along its longitudinal development movable at an adjustable speed;

pneumatic suction means (30; 130) cooperating with said flexible belt (12; 112), said flexible belt arranged to receive the rolls from said conveyor and to hold and advance said rolls beneath said belt by means of the pneumatic suction created by said pneumatic suction means through said apertures (22) and to move said rolls away from said conveyor (1; 101), drive means for changing the speed ratio between said conveyor (1, 101) and said belt (12; 112) in order to vary the speed of said belt, said drive means for changing the speed ratio is an electro-mechanical means (2), and more particularly a separate electrical variable-speed motor.

2. Apparatus according to claim 1, characterized in that said conveyor (1, 3, 5, 7, 201) feeds the rolls to said belt (12) in a spaced-apart relationship, and includes a sensor means (203) associated with said belt, said sensor means (203) detecting the length of each roll (R) moved by said belt and including a trim discharging means (207) arranged downstream of said sensor means, with said discharging means being activated each time the sensor means (203) detects the passage of trim which is shorter than a roll.

3. Apparatus according to claim 2, characterized in that said discharging means include an air nozzle (307).

4. Apparatus according to claim 2, characterized in that a trim tilting means (211) is combined with said conveyor (1; 201) to cause the trims to tilt before they reach said belt (12).

5. An apparatus for removing trims or scraps from rows or logs of small rolls of web material, said apparatus including a roll conveyor (1; 101) for advancing rows of said small rolls (R) in spaced relation to succeeding rows at a predetermined speed whereby to provide intervals between successive rows, and including trim discharging means, characterized in that it includes:

a continuous flexible belt (12; 112) having apertures (22) arranged along its longitudinal development;

pneumatic suction means (30; 130) cooperating with said flexible belt (12; 112), said flexible belt arranged to receive the rolls from said conveyor and to hold and advance said rolls beneath said belt by means of the pneumatic suction created by said pneumatic suction means through said apertures (22) and to move said rolls away from said roll conveyor (1; 101), a longitudinally extending suction inhibiting portion (12Z) of said belt (12, 112) having no apertures, the advancing movement of said belt being synchronized with the motion of said conveyor (1; 101) such that during said motion said extending portion (12Z) is made to correspond to the interval between the trailing end of a row of rolls formed from one log and the beginning of the subsequent row of rolls formed from the subsequent log permitting the discharge of any trim positioned therebeneath.

6. An apparatus for removing trims or scraps from rows or logs of small rolls of web material, said apparatus including a roll conveyor (1; 101) for advancing rows of said small rolls (R) in spaced relation to succeeding rows at a predetermined speed whereby to provide intervals between successive rows, and including trim discharging means, characterized in that it includes:

a continuous flexible belt (12; 112) having apertures (22) arranged along its longitudinal development;

pneumatic suction means (30; 130) cooperating with said flexible belt (12; 112), said flexible belt arranged to receive the rolls from said conveyor and to hold and advance said rolls beneath said belt by means of the pneumatic suction created by said pneumatic suction means through said apertures (22) and to move said rolls away from said roll conveyor (1; 101), said roll conveyor (1, 3, 5, 7, 201) arranged to feed the rolls to said belt (12) in a spaced relationship, and including a sensor means (203) associated with said flexible belt (12), said sensor means (203) arranged to detect the length of each roll (R) moved by said belt and including a trim discharging means (207) arranged downstream of said sensor means, with said discharging means being activated each time the sensor means (203) detects the passage of trim which is shorter than a roll.

7. Apparatus according to claim 5 or 6, characterized in that the belt (12) includes two longitudinal flexible continuous lips (24) with the apertures (22) disposed between said lips (24).

8. Apparatus according to claim 5 or 6, characterized in that said belt (12) comprises two spaced apart members, parallel to one another, which define a suction aperture between them.

9. Apparatus according to claim 5 or 6, characterized in that the belt (112) is carried by a vertically adjustable unit (147) able to accommodate small rolls of different diameters.

10. Apparatus according to claim 5 or 6, characterized in that it comprises drive means to change the speed ratio between said conveyor (1, 101) and said belt (12; 112) in order to vary the speed of said belt (12; 112).

11. Apparatus according to claim 5 or 6, characterized in that said belt (12; 112) is a toothed belt and is driven between at least two wheels (14, 16; 114, 116; 114A, 116A).

12. Apparatus according to claim 5, characterized in that said continuous belt is adjustable in position in order to phase the extending portion (12Z) thereof without apertures with respect to the interval between subsequent rows of small rolls.

13. Apparatus according to claim 5, characterized in that at least a region of the extending portion (12Z) devoid of apertures (22) is created by applying aperture-plugging material which can be applied and removed as desired to modify, at need, the length of said extending portion (12Z).

14. Apparatus according to claim 6 characterized in that said discharging means includes an air nozzle (207).

15. Apparatus according to claim 14 characterized in that a trim tilting means (211) is combined with said conveyor (1; 201) to cause the trims to tilt before they reach said belt (12).

* * * * *